United States Patent
Horiuchi et al.

(10) Patent No.: US 9,295,037 B2
(45) Date of Patent: Mar. 22, 2016

(54) BASE STATION, TERMINAL, TRANSMISSION METHOD, AND RECEPTION METHOD

(75) Inventors: Ayako Horiuchi, Kanagawa (JP); Yasuaki Yuda, Kanagawa (JP); Seigo Nakao, Kanagawa (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 419 days.

(21) Appl. No.: 13/823,966

(22) PCT Filed: Sep. 22, 2011

(86) PCT No.: PCT/JP2011/005338
§ 371 (c)(1),
(2), (4) Date: Mar. 15, 2013

(87) PCT Pub. No.: WO2012/046403
PCT Pub. Date: Apr. 12, 2012

(65) Prior Publication Data
US 2013/0279481 A1    Oct. 24, 2013

(30) Foreign Application Priority Data

Oct. 8, 2010 (JP) ................................. 2010-228713

(51) Int. Cl.
*H04W 72/04* (2009.01)
*H04L 5/00* (2006.01)
*H04W 84/04* (2009.01)

(52) U.S. Cl.
CPC ......... *H04W 72/0406* (2013.01); *H04L 5/0007* (2013.01); *H04L 5/0053* (2013.01); *H04W 84/047* (2013.01)

(58) Field of Classification Search
None
See application file for complete search history.

(56) References Cited

U.S. PATENT DOCUMENTS

| 2010/0254287 | A1 | 10/2010 | Sawahashi et al. |
| 2011/0116465 | A1 | 5/2011 | Miki et al. |

FOREIGN PATENT DOCUMENTS

| JP | 2005-057684 A | 3/2005 |
| JP | 2009-118017 A | 5/2009 |

(Continued)

OTHER PUBLICATIONS

International Search Report for PCT/JP2011/005338 dated Nov. 8, 2011.

(Continued)

*Primary Examiner* — Huy D Vu
*Assistant Examiner* — Teisha D Hall
(74) *Attorney, Agent, or Firm* — Pearne & Gordon LLP

(57) ABSTRACT

A base station, a terminal, a transmission method and a reception method that allow the data processing on a reception side to have a margin irrespective of the time position of a resource region where control information is mapped. In a base station (100), a subframe type determining unit (101) determines, according to a configuration pattern applied to the local base station apparatus and being one of a plurality of configuration patterns different between downlink and uplink subframe configurations in time division multiplex, whether a subframe to be determined is a first type of subframe where control information is mapped only to a PDCCH region or a second type of subframe where the control information is mapped to both the PDCCH region and an R-PDCCH region. An allocation region candidate determining unit (102) determines, based on a result of the determination by the subframe type determining unit (101), a mapping region, where the control information is mapped, in the PDCCH or R-PDCCH region in the subframe to be determined.

6 Claims, 14 Drawing Sheets

(56) References Cited

FOREIGN PATENT DOCUMENTS

| JP | 2009-147747 A | 7/2009 |
| JP | 2009-272827 A | 11/2009 |

OTHER PUBLICATIONS

3GPP TSG RAN WG1 meeting, R1-102700 "Backhaul Control Channel Design in Downlink" May 2010.
3GPP TSG RAN WG1 meeting, R1-102881 "R-PDCCH placement" May 2010.
Ayako Iwata et al "Relay system in LTE-Advanced" 2010 Nen IEICE Communications Society Conference Koen Ronbunshu 1, Aug. 31, 2010, pp. S-19, S-20, BS-2-7.
Ayako Iwata et al "Interference coordination for LTE-Advanced with Relay", IEICE Technical Report, Jul. 9, 2009, vol. 109, No. 130, pp. 65-70.
ZTE "The mapping schemes of R-PDCCH" TSG-RAN WG1 #61 R1-102915, May 10, 2010.
Nokia Siemens Networks, Nokia "On DL Backhaul Control Channel Design Aspects" 3GPP TSG-RAN WG1 Meeting #61 R1-102969, May 10, 2010.
Panasonic "Resource allocation of R-PDSCH" 3GPP TSG RAN WG1 Meeting #61bis R1-103982, Jun. 28, 2010.

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 8

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | – | – | 6 | – | 4 | – | – | 6 | – | 4 |
| 1 | – | – | 7,6 | 4 | – | – | – | 7,6 | 4 | – |
| 2 | – | – | 8,7,4,6 | – | – | – | – | 8,7,4,6 | – | – |
| 3 | – | – | 7,6,11 | 6,5 | 5,4 | – | – | – | – | – |
| 4 | – | – | 12,8,7,11 | 6,5,4,7 | – | – | – | – | – | – |
| 5 | – | – | 13,12,9,8,7,5,4,11,6 | – | – | – | – | – | – | – |
| 6 | – | – | 7 | 7 | 5 | – | – | 7 | 7 | – |

FIG. 9

| Backhaul Subframe configuration | Uplink-downlink Configuration at RN cell [3] | Downlink:Uplink ratio | Subframe number | | | | | | | | | |
|---|---|---|---|---|---|---|---|---|---|---|---|---|
| | | | 0 | 1 | 2 | 3 | 4 | 5 | 6 | 7 | 8 | 9 |
| 0 | 1 | 1:1 | | | | | D | | | | U | |
| 1 | 1 | 1:1 | | | | U | | | | | | D |
| 2 | 2 | 2:1 | | | | | D | | | | U | D |
| 3 | 2 | 2:1 | | | | U | D | | | | | D |
| 4 | 2 | 2:1 | | | U | U | D | | | | U | D |
| 5 | 2 | 2:2 | | | U | | | | | U | D | |
| 6 | 3 | 1:1 | | | | D | D | | | | D | |
| 7 | 3 | 1:1 | | | | D | | | | U | D | D |
| 8 | 3 | 2:1 | | | | D | U | | | U | D | D |
| 9 | 3 | 3:1 | | | | U | | | | D | D | D |
| 10 | 4 | 1:1 | | | | U | | | | | | D |
| 11 | 6 | 1:1 | | | | | U | | | | | D |

FIG. 12

| Backhaul Subframe configuration | Uplink-downlink Configuration at RN cell | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 1 | – | – | 7,6 | 4 | BH-DL | – | – | 7,6 | BH-UL | – |
| 1 | 1 | – | – | 7,6 | BH-UL | – | – | – | 7,6 | 4 | BH-DL |
| 2 | 1 | – | – | 7,6 | BH-UL | BH-DL | – | – | 7,6 | BH-UL | BH-DL |
| 3 | 1 | – | – | 7,6 | BH-UL | BH-DL | – | – | 7,6 | – | BH-DL |
| 4 | 1 | – | – | 7,6 | BH-UL | BH-DL | – | – | 7,6 | BH-UL | BH-DL |
| 5 | 2 | – | – | BH-UL | – | – | – | – | 8,7,4,6,13,11 | BH-DL | – |
| 6 | 2 | – | – | 8,7,4,6,13,12,11 | BH-DL | – | – | – | BH-UL | – | – |
| 7 | 2 | – | – | BH-UL | BH-UL | BH-DL | – | – | 8,7,4,6,12,11 | BH-DL | – |
| 8 | 3 | – | – | 8,7,4,6,12,11 | – | BH-DL | – | – | – | – | BH-DL |
| 9 | 3 | – | – | 7,6,11 | BH-UL | 4 | – | – | – | – | BH-DL |
| 10 | 4 | – | – | 12,8,7,11,6,5,4 | BH-UL | – | – | – | – | – | BH-DL |
| 11 | 6 | – | – | 7 | 7 | BH-UL | – | – | 7 | 7 | BH-DL |

FIG. 13

| TDD Uplink-downlink configuration | Subframe number $i$ | | | | | | | | | |
|---|---|---|---|---|---|---|---|---|---|---|
| | 0 | 1 | 2 | 3 | 4 | 5 | 6 | 7 | 8 | 9 |
| 0 | – | – | 6 | 7 | 4 | – | – | 6 | 7 | 4 |
| 1 | – | – | 6 | 4 | – | – | – | 6 | 4 | – |
| 2 | – | – | 4 | – | – | – | – | 4 | – | – |
| 3 | – | – | 4 | 4 | 4 | – | – | – | – | – |
| 4 | – | – | 4 | 4 | – | – | – | – | – | – |
| 5 | – | – | 4 | – | – | – | – | – | – | – |
| 6 | – | – | 7 | 7 | 5 | – | – | 7 | 7 | – |

FIG. 14

BASE STATION, TERMINAL, TRANSMISSION METHOD, AND RECEPTION METHOD

TECHNICAL FIELD

The present invention relates to a base station, a terminal, a transmission method, and a reception method.

BACKGROUND ART

In recent years, in a cellular mobile communication system, with a trend toward multimedia information, transmission of large-volume data, such as still image data and motion image data, as well as sound data has been generalized. In order to realize transmission of large-volume data, studies on a technique for realizing a high transmission rate using a high-frequency radio band has been popularly conducted.

However, when the high-frequency radio band is used, while a high transmission rate can be expected at a short range, attenuation due to a transmission distance increases at a longer distance. Accordingly, when a mobile communication system using a high-frequency radio band is practically operated, since the coverage area of a radio communication base station apparatus (hereinafter, abbreviated as "base station") becomes small, it is necessary to establish more base stations. The establishment of the base stations requires reasonable costs. Therefore, there is strong demand for a technique for realizing a communication service using a high-frequency radio band while suppressing an increase in the number of base stations.

For this demand, in order to expand the coverage area of each base station, a relay transmission technique in which a radio communication relay station apparatus (hereinafter, abbreviated as "relay station") is provided between a base station and a radio communication mobile station apparatus (hereinafter, abbreviated as "mobile station"), and communication between the base station and the mobile station is performed through the relay station has been studied. If the relay technique is used, a mobile station which cannot perform direct communication with a base station can perform communication through a relay station.

In regard to an LTE-A (Long Term Evolution Advanced) system in which the introduction of the above-described relay technique has been studied, from the viewpoint of smooth transition from LTE (Long Term Evolution) and coexistence with LTE, there is demand for maintaining compatibility with LTE. For this reason, in regard to the relay technique, there is demand for mutual compatibility with LTE. In the LTE-A system, in order to attain compatibility with LTE, at the time of transmission from a base station to a relay station in a downlink (hereinafter, referred to as "DL"), the setting of an MBSFN (MBMS Single Frequency Network) subframe has been studied. The term "MBSFN subframe" is a subframe which is defined so as to transmit MBMS (Multimedia Broadcast Multicast Service) data. An LTE terminal has a specification for an operation so as not to use a reference signal in an MBSFN subframe. Accordingly, in LTE-A, a method in which an access link subframe overlapping a backhaul link subframe used for communication between the relay station and the base station is set in an MBSFN subframe has been proposed. With this proposal, it is possible to avoid the LTE terminal from erroneously detecting the reference signal.

The communication between the base station and the mobile station through the relay station is performed by time-division relay (called TD relay or Type 1 relay). Backhaul communication (that is, communication between the base station and the relay station) and relay access link communication (that is, communication between the relay station and the terminal) are divided on the time axis, thereby dividing the transmitting time and the receiving time of the relay station. Accordingly, the relay station can perform relay without being affected by wraparound between a transmitting antenna and a receiving antenna.

FIG. 1 shows an example of an allocation state of control signals and data for each station of a base station, a relay station, and a mobile station when a subframe of an LTE system is used. As shown in FIG. 1, in the LTE system, a downlink control signal which is transmitted or received in each station is arranged in a PDCCH (Physical Downlink Control Channel) region of a head portion of the subframe. That is, both the base station and the relay station transmit the control signal in the PDCCH region of the head portion of the subframe. When focusing on the relay station, since the downlink control signal should be transmitted to the mobile station even in the MBSFN subframe, the relay station transmits the control signal to the mobile station and is thereafter switched to receiving processing, thereby preparing for receiving a signal transmitted from the base station. However, since the base station also transmits the downlink control signal intended for the relay station at the timing at which the relay station transmits the downlink control signal to the mobile station, the relay station cannot receive the downlink control signal transmitted from the base station. In order to avoid this inconvenience, in the LTE-A, providing a region for arranging the downlink control signal for the relay station (R-PDCCH (Relay PDCCH) region) in a data region has been studied.

In LTE, a DL grant instructing DL data allocation and a UL grant instructing UL data allocation are included in the PDCCH. With the DL grant, a resource in a subframe in which the DL grant is transmitted is allocated to the mobile station. In regard to the UL grant, in an FDD system, with the UL grant, a resource in a target subframe next to four subframes after a subframe in which the UL grant is transmitted is allocated to the mobile station. In a TDD system, with the UL grant, a resource in a target subframe next to four or more subframes after a subframe in which the UL grant is transmitted is allocated to the mobile station. In the TDD system, how many subframes are next to a subframe to which a resource is allocated by the UL grant after a subframe in which the UL grant is transmitted is determined in accordance with a pattern in which an uplink and a downlink are time-divided (hereinafter, referred to as "UL/DL configuration pattern").

In LTE-A, including a DL grant and a UL grant in an R-PDCCH has been studied. In the R-PDCCH, arranging the DL grant in a first slot and the UL grant in a second slot has been studied (see NPLs 1 and 2). In this way, if the DL grant is arranged only in the first slot, the decoding delay of the DL grant is reduced, thereby preparing for ACK/NACK transmission for DL data (in FDD, transmission next to four subframes after reception of the DL grant).

As shown in FIG. 2, a method in which a resource block of a physical layer (PRB) in which an R-PDCCH region is provided differs between the relay stations has been studied. The relay station performs blind decoding on the downlink control signal, which is transmitted from the base station using the R-PDCCH region in this way, in a resource region instructed from the base station by higher layer signaling, and the downlink control signal intended for the relay station is found.

CITATION LIST

Non-Patent Literature

NPL 1
3GPP TSG RAN WG1 meeting, R1-102700, "Backhaul Control Channel Design in Downlink," May 2010

NPL 2

3GPP TSG RAN WG1 meeting, R1-102881, "R-PDCCH placement," May 2010

SUMMARY OF INVENTION

Technical Problem

On the other hand, hereinafter, considering M2M (Machine to Machine) communication or the like in which various devices are introduced as a radio communication terminal, there is a concern for a lack of resources of a region (hereinafter, referred to as "PDCCH region"), to which the PDCCH is mapped, due to an increase in the number of terminals. If the PDCCH cannot be mapped due to a lack of resources, downlink data allocation for terminals cannot be performed. For this reason, even when a resource region to which downlink data is mapped (hereinafter, referred to as "PDSCH region") is empty, the resource region cannot be used, and system throughput may be degraded. As a method of eliminating a lack of resources, arranging a control signal toward a terminal under the base station in a region to which the above-described R-PDCCH is mapped (hereinafter, referred to as "R-PDCCH region") has been considered (see FIG. 3).

However, when a control signal toward a terminal under the base station is mapped to the R-PDCCH region and transmitted, delay in processing corresponding to the control signal in the terminal becomes problematic.

That is, as described above, in LTE and LTE-A, the timing of transmitting ACK/NACK for DL data and the timing of transmitting UL data are defined on the basis of subframes in which the DL grant and the UL grant as control signals are received. The PDCCH region and the R-PDCCH region are arranged in order of the PDCCH region and the R-PDCCH region in a time direction. Accordingly, when a control signal is mapped to the R-PDCCH region and transmitted, the terminal has no margin up to the time at which processing corresponding to the received control signal should be completed, compared to a case where a control signal is mapped to the PDCCH region and transmitted.

This problem becomes problematic in the relay station in addition to a terminal which performs communication with the base station, and in particular, becomes conspicuous in a terminal which requires high restrictions on circuit scale and power consumption.

An object of the invention is to provide a base station, a terminal, a transmission method, and a reception method capable of allowing data processing on a reception side to have a margin regardless of the time position of a resource region to which control information is mapped.

Solution to Problem

According to an aspect of the invention, there is provided a base station which maps control information to one of a first resource region and a second resource region provided in order in a time direction in a subframe and transmits the control information. The base station includes determining section that determines whether a subframe to be determined is a first type subframe in which control information is mapped only to the first resource region or a second type subframe in which the control information is mapped to both the first resource region and the second resource region in accordance with a configuration pattern which is applied to the base station and is one of a plurality of configuration patterns having different downlink and uplink subframe configurations in time-division multiplex, and deciding section that decides a mapping region, to which the control information is mapped, in the first resource region or the second resource region in the sub frame to be determined on the basis of the determination result in the determining section.

According to another aspect of the invention, there is provided a terminal which receives control information in one of a first resource region and a second resource region provided in order in a time direction in a sub frame. The terminal includes determining section that determines whether a subframe to be determined is a first type subframe in which control information is mapped only to the first resource region or a second type subframe in which the control information is mapped to both the first resource region and the second resource region in accordance with a configuration pattern which is applied to the base station and is one of a plurality of configuration patterns having different downlink and uplink subframe configurations in time-division multiplex, and specifying section that specifies a mapping region candidate, to which the control information is mapped, in the first resource region or the second resource region in the subframe to be determined on the basis of the determination result by the determining section.

According to a further aspect of the invention, there is provided a transmission method which maps control information to one of a first resource region and a second resource region provided in order in a time direction in a subframe and transmits the control information. The transmission method includes the steps of determining whether a subframe to be determined is a first type subframe in which control information is mapped only to the first resource region or a second type subframe in which the control information is mapped to both the first resource region and the second resource region in accordance with a configuration pattern which is applied to the base station and is one of a plurality of configuration patterns having different downlink and uplink subframe configurations in time-division multiplex, and deciding a mapping region, to which the control information is mapped, in the first resource region or the second resource region in the subframe to be determined on the basis of the result of the determination.

According to still another aspect of the invention, there is provided a reception method which receives control information in one of a first resource region and a second resource region provided in order in a time direction in a subframe. The reception method includes the steps of determining whether a subframe to be determined is a first type sub frame in which control information is mapped only to the first resource region or a second type subframe in which the control information is mapped to both the first resource region and the second resource region in accordance with a configuration pattern which is applied to the base station and is one of a plurality of configuration patterns having different downlink and uplink subframe configurations in time-division multiplex, and specifying a mapping region candidate, to which the control information is mapped, in the first resource region or the second resource region in the sub frame to be determined on the basis of the result of the determination.

Advantageous Effects of Invention

According to the invention, it is possible to provide a base station, a terminal, a transmission method, and a reception method capable of allowing data processing on a reception side to have a margin regardless of the time position of a resource region to which control information is mapped.

BRIEF DESCRIPTION OF DRAWINGS

FIG. 8 is a diagram showing an example of a transmission rule table;

FIG. 9 is a diagram showing an example of a transmission rule table;

FIG. 12 is a diagram showing an example of a transmission rule table which is used in a relay station and a terminal;

FIG. 13 is a diagram showing an example of a transmission rule table which is used in a relay station and a terminal;

FIG. 14 is a diagram showing an example of a transmission rule table according to Embodiment 2 of the invention.

DESCRIPTION OF EMBODIMENTS

Figure 1:
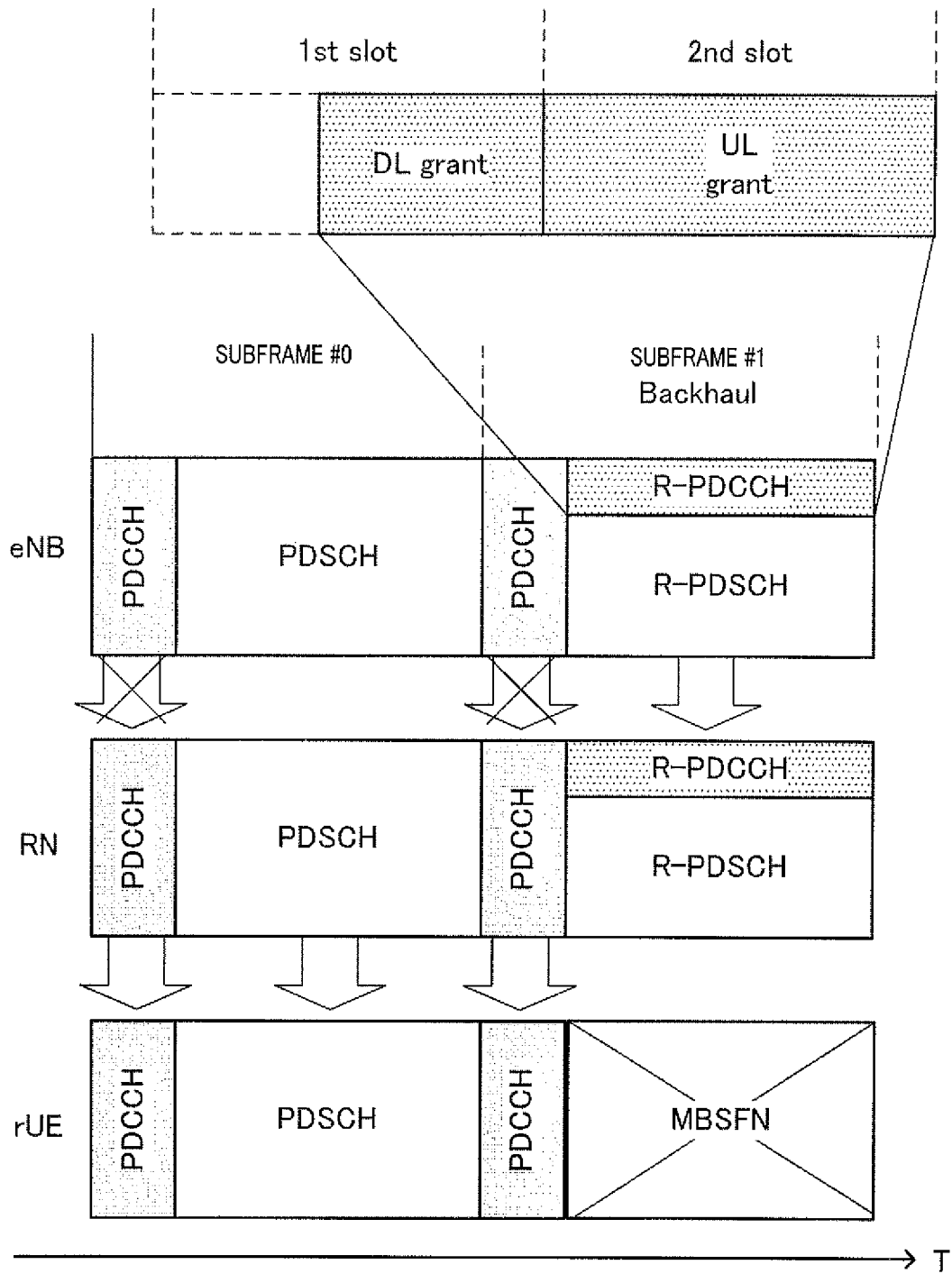
FIG. 1 is a diagram showing an example of an allocation state of control signals and data for each station of a base station, a relay station, and a mobile station when a subframe of an LTE system is used.
Figure 2:
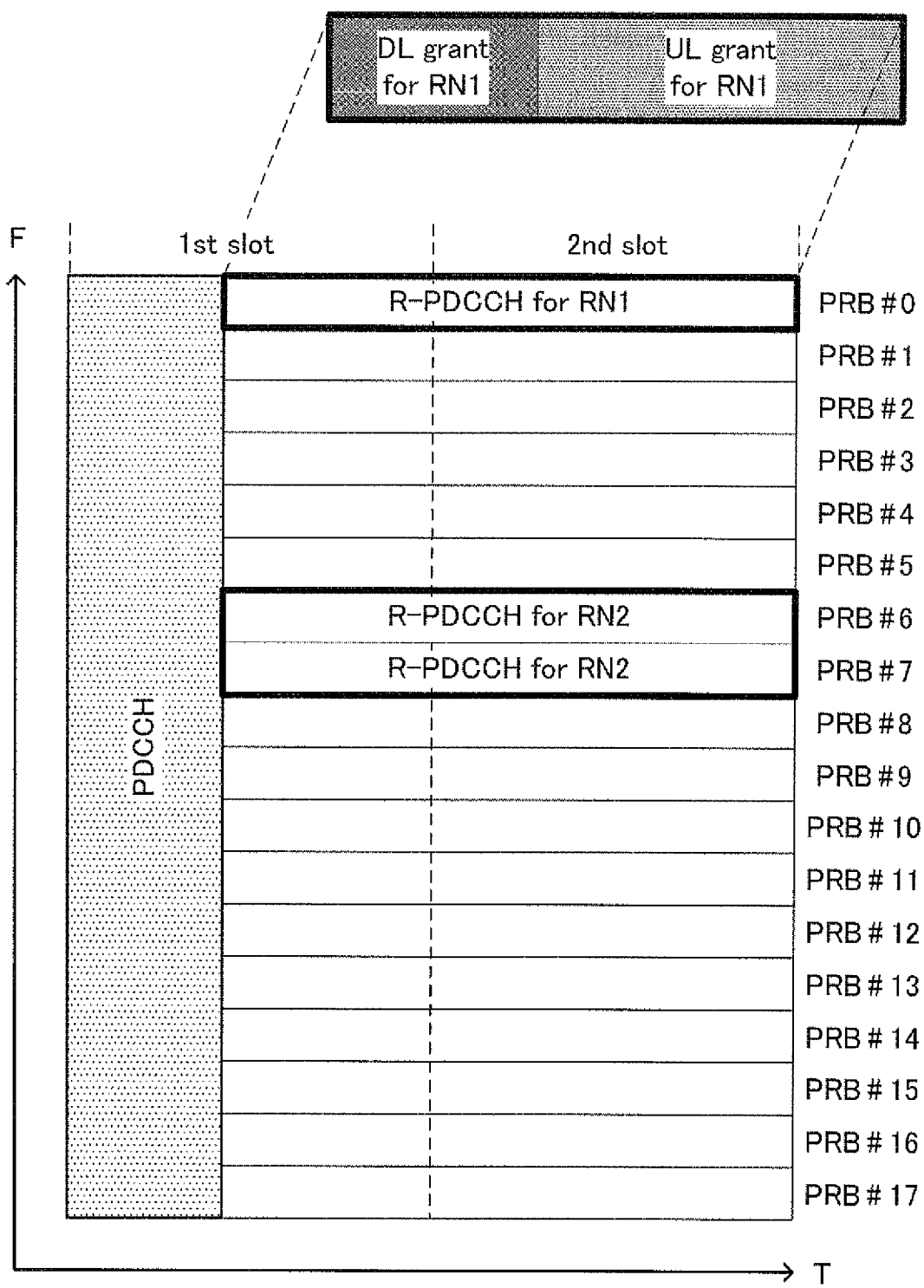
FIG. 2 is a diagram showing a configuration example of an R-PDCCH.
Figure 3:
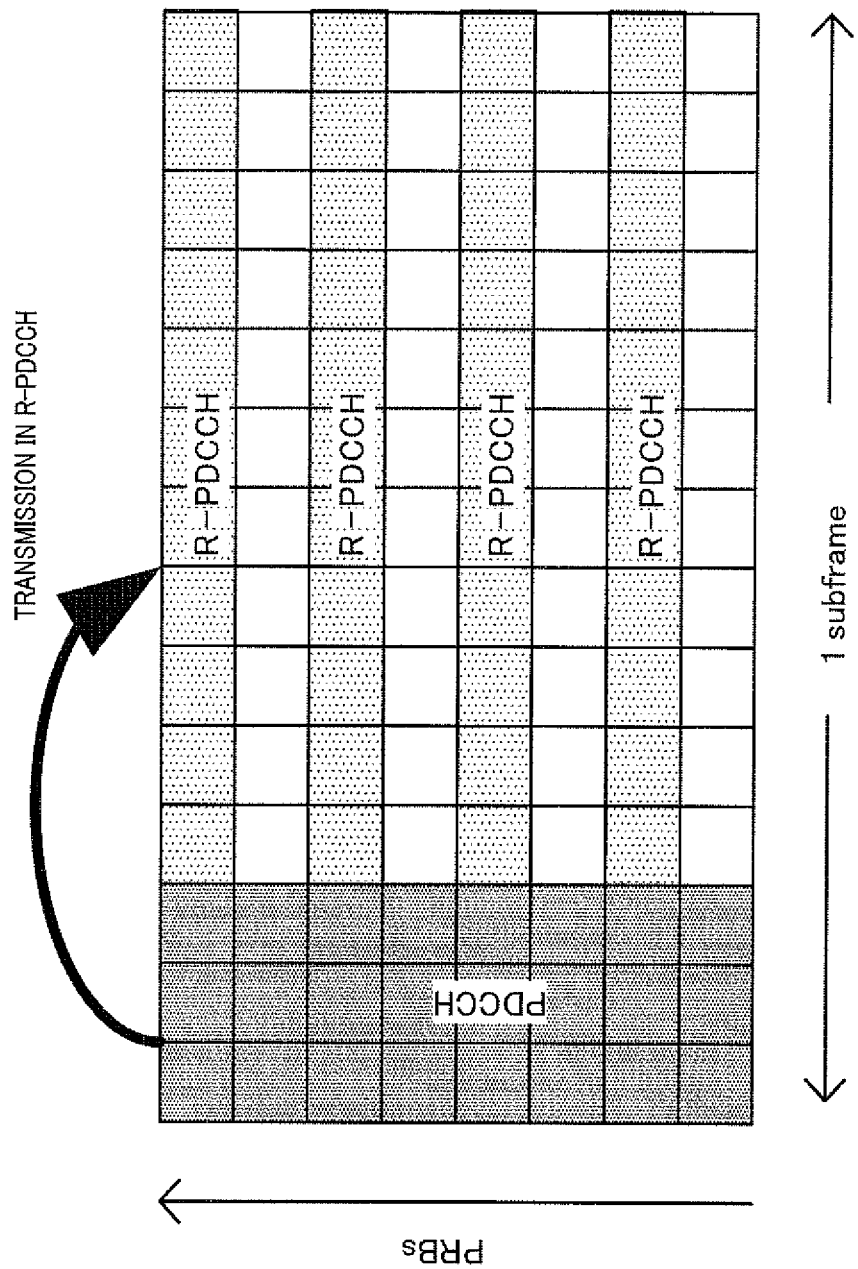
FIG. 3 is a diagram showing an example of an R-PDCCH region.

Hereinafter, embodiments of the invention will be described in detail with reference to the drawings. In the embodiments, the same constituent elements are represented by the same reference numerals, and overlapping description will not be repeated.

Embodiment 1

Overview of Communication System

A communication system according to Embodiment 1 of the invention has base station 100 and terminal 200. Base station 100 is an LTE-A base station, and terminal 200 is an LTE-A terminal.

Figure 4:
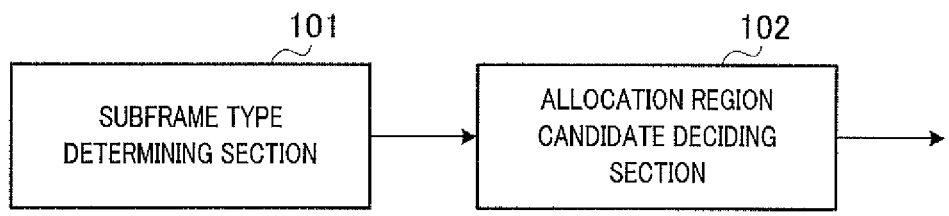
FIG. 4 is a main configuration diagram of a base station according to Embodiment 1 of the invention.

FIG. 4 is a main configuration diagram of base station 100 according to Embodiment 1 of the invention. Base station 100 maps control information to one of a first resource region (for example, PDCCH region) and a second resource region (for example, R-PDCCH region) provided in order in a time direction in a subframe and transmits the control information. In base station 100, subframe type determining section 101 determines whether a subframe to be determined is a first type subframe in which the control information can be mapped only to the first resource region or a second type subframe in which the control information can be mapped to both the first resource region and the second resource region, in accordance with a configuration pattern which is applied to the base station and is one of a plurality of configuration patterns (UL/DL configuration patterns) having downlink subframe and uplink subframe configurations in time-division multiplex. Allocation region candidate deciding section 102 decides a mapping region, to which the control information is mapped, in the first resource region or the second resource region in the subframe to be determined on the basis of the determination result by subframe type determining section 101.

Figure 5:
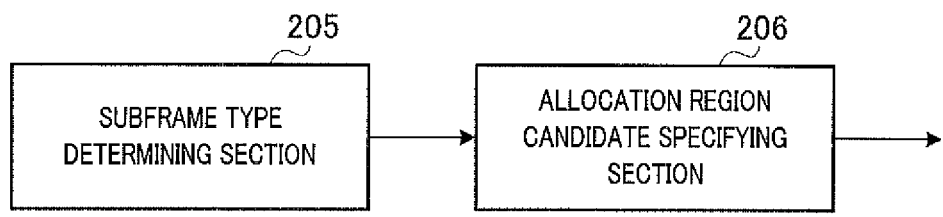
FIG. 5 is a main configuration diagram of a terminal according to Embodiment 1 of the invention.

FIG. 5 is main configuration diagram of terminal 200 according to Embodiment 1 of the invention. Terminal 200 receives control information in one of a first resource region and a second resource region provided in order in a time direction in a subframe. In terminal 200, subframe type determining section 205 determines whether a subframe to be determined is a first type subframe to which the control information can be mapped to the first resource region or a second type subframe in which the control information can be mapped to both the first resource region and the second resource region in accordance with a configuration pattern which is applied to the terminal and is one of a plurality of configuration patterns having different downlink subframe and uplink subframe configurations in time-division multiplex. Allocation region candidate specifying section 206 specifies a mapping region candidate, to which the control information is mapped, in the first resource region or the second resource region in the subframe to be determined on the basis of the determination result by subframe type determining section 205.

[Configuration of Base Station 100]

Figure 6:
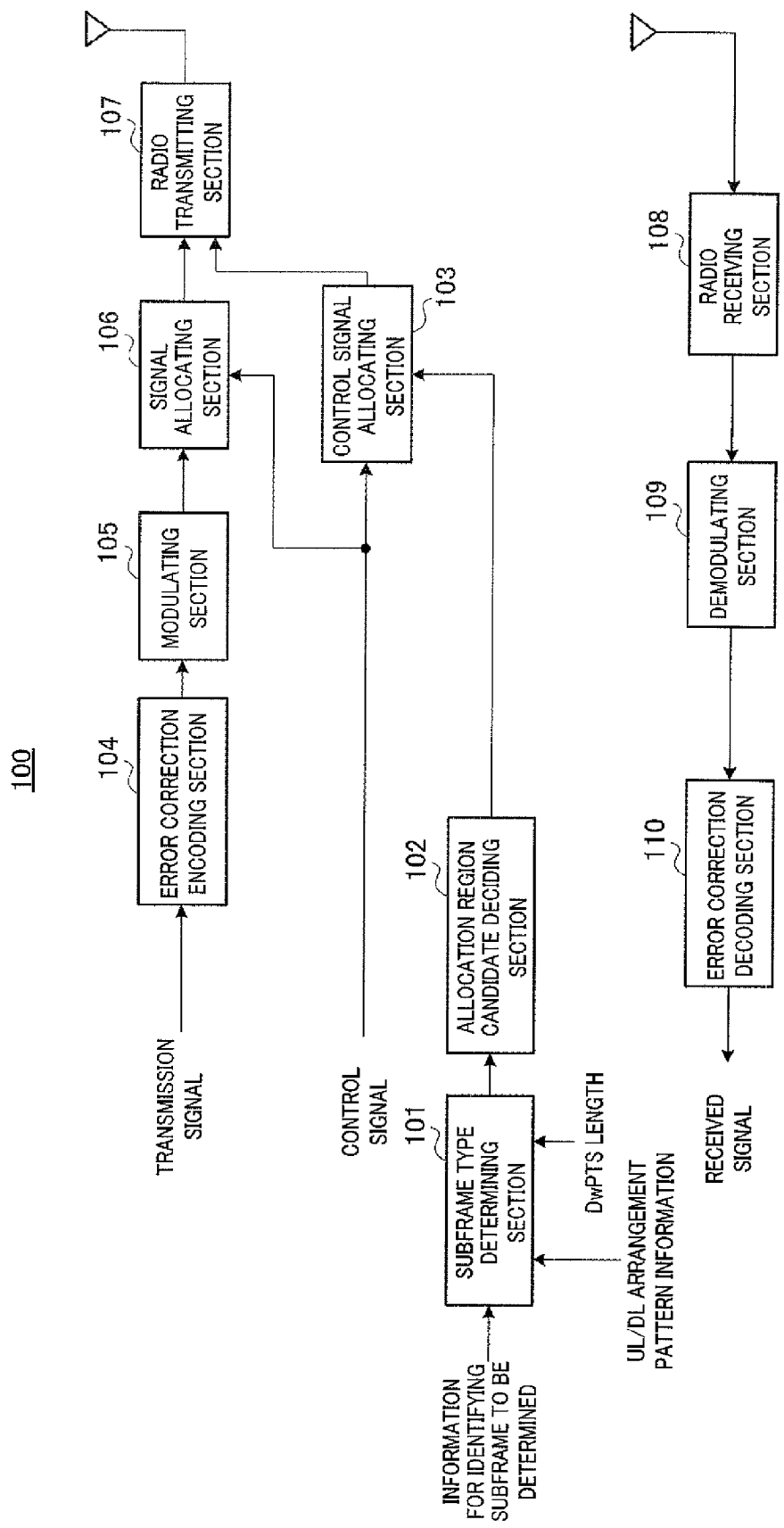
FIG. 6 is a block diagram showing the configuration of the base station according to Embodiment 1 of the invention.

FIG. 6 is a block diagram showing the configuration of base station 100 according to Embodiment 1 of the invention. In FIG. 6, base station 100 has subframe type determining section 101, allocation region candidate deciding section 102, control signal allocating section 103, error correction encoding section 104, modulating section 105, signal allocating section 106, radio transmitting section 107, radio receiving section 108, demodulating section 109, and error correction decoding section 110.

Subframe type determining section 101 determines the type of a subframe to be determined.

Specifically, subframe type determining section 101 determines whether the subframe to be determined is the first type subframe in which the control information can be mapped only to the PDCCH region or the second type subframe in which the control information can be mapped to both the PDCCH region and the R-PDCCH region. The control information is downlink allocation control information (that is, DL grant) which instructs a mapping region to which a downlink data signal is mapped. Subframe type determining section 101 determines whether the subframe to be determined is the first type subframe or the second type subframe in accordance with a "UL/DL configuration pattern" which is applied to the base station. The UL/DL configuration pattern is a downlink subframe and uplink subframe configuration pattern in time-division multiplex. The UL/DL configuration pattern is set for each base station 100. Accordingly, a common UL/DL configuration pattern is used between base station 100 and all terminals 200 in a cell of base station 100. The UL/DL configuration pattern may be shared between base station 100 and terminal 200 at the time of initial access of terminal 200 to base station 100, or may be included in notification information from base station 100 and notified to terminal 200. For example, the UL/DL configuration pattern and a DwPTS length are included in a control signal, called SIB1 (System Information Block Type 1 message), and transmitted from base station 100 to terminal 200 in a broadcast manner. Terminal 200 receives the control signal when being connected to base station 100, and uses the same value for a while. When there is a change in the value, base station 100 transmits a paging message to terminal 200 such that terminal 200 receives SIB1 again.

Specifically, subframe type determining section 101 receives identification information of the subframe to be determined, UL/DL configuration pattern information, and the DwPTS length as input. Subframe type determining section 101 determines whether the subframe to be determined is the first type subframe or the second type sub frame on the basis of the identification information of the subframe to be determined, the UL/DL configuration pattern information, and a "transmission rule table".

In the "transmission rule table", in regard to each of a plurality of configuration patterns having different downlink subframe and uplink subframe configurations, a plurality of downlink subframes in the configuration pattern are associated with uplink subframes in which a retransmission control signal relating to the downlink data signal corresponding to the downlink allocation control information to be transmitted in each downlink subframe can be transmitted. When the interval between a downlink subframe to be determined in which downlink allocation control information is transmitted and an uplink subframe associated with the downlink subframe to be determined in the transmission rule table is equal to or greater than a "predetermined value", subframe type determining section 101 determines the downlink subframe to be determined as the second type subframe. The "predetermined value" is, for example, five subframes.

The configuration pattern includes switching subframes in addition to the downlink subframes and the uplink subframes. Each switching subframe includes a downlink period, an uplink period, and a guard period which is not used in both the downlink period and the uplink period. Accordingly, in the "transmission rule table", in regard to each of a plurality of configuration patterns having different configurations, the switching subframes in the configuration pattern are associated with uplink subframes in which the retransmission control signal relating to the downlink data signal corresponding to the downlink allocation control information to be transmitted in the downlink period of each switching subframe can be transmitted. When the interval between a switching subframe to be determined and an uplink subframe associated with the switching subframe to be determined in the transmission rule table is equal to or greater than a "predetermined value", sub frame type determining section 101 determines the switching subframe to be determined as the second type subframe.

Subframe type determining section 101 may add the following condition as the condition for determining the switching subframe to be determined as the second type subframe. That is, only when the length of the downlink period of the switching subframe to be determined is greater than a predetermined value, subframe type determining section 101 determines the switching subframe to be determined as the second type subframe. The transmission rule table is stored in a storage section (not shown) provided in subframe type determining section 101.

Allocation region candidate deciding section 102 decides an allocation region candidate (that is, search space), to which the control information is mapped, in the PDCCH region or the R-PDCCH region in the subframe to be determined on the basis of the determination result by subframe type determining section 101. That is, when it is determined that the subframe to be determined is the first type subframe, only the PDCCH region is a region in which an allocation region candidate can be set. Meanwhile, when it is determined that the subframe to be determined is the second type subframe, both the PDCCH region and the R-PDCCH region are regions in which an allocation region candidate can be set.

Control signal allocating section 103 maps the input control signal (in this case, DL grant) in the allocation region candidate decided by allocation region candidate deciding section 102.

Error correction encoding section 104 receives a transmission signal as input, performs error correction encoding on the input signal, and outputs the resultant signal to the modulating section 105.

Modulating section 105 modulates a signal received from error correction encoding section 104 and outputs the modulated signal to signal allocating section 106.

Signal allocating section 106 maps the modulated signal received from the modulating section 105 to a resource region corresponding to the input control signal, and outputs the resultant signal to radio transmitting section 107. Specifically, signal allocating section 106 maps a data signal intended for the mobile station to a resource region indicated by the DL grant included in the downlink control signal intended for the mobile station.

Radio transmitting section 107 performs radio transmission processing, such as up-conversion, on an input signal and transmits the resultant signal through an antenna.

Radio receiving section 108 receives a signal transmitted from the terminal 200 through the antenna, performs radio processing, such as down-conversion, and outputs the resultant signal to demodulating section 109.

Demodulating section 109 demodulates an input signal and outputs the demodulated signal to error correction decoding section 110.

Error correction decoding section 110 decodes an input signal and outputs the obtained received signal.

[Configuration of Terminal 200]

Figure 7:
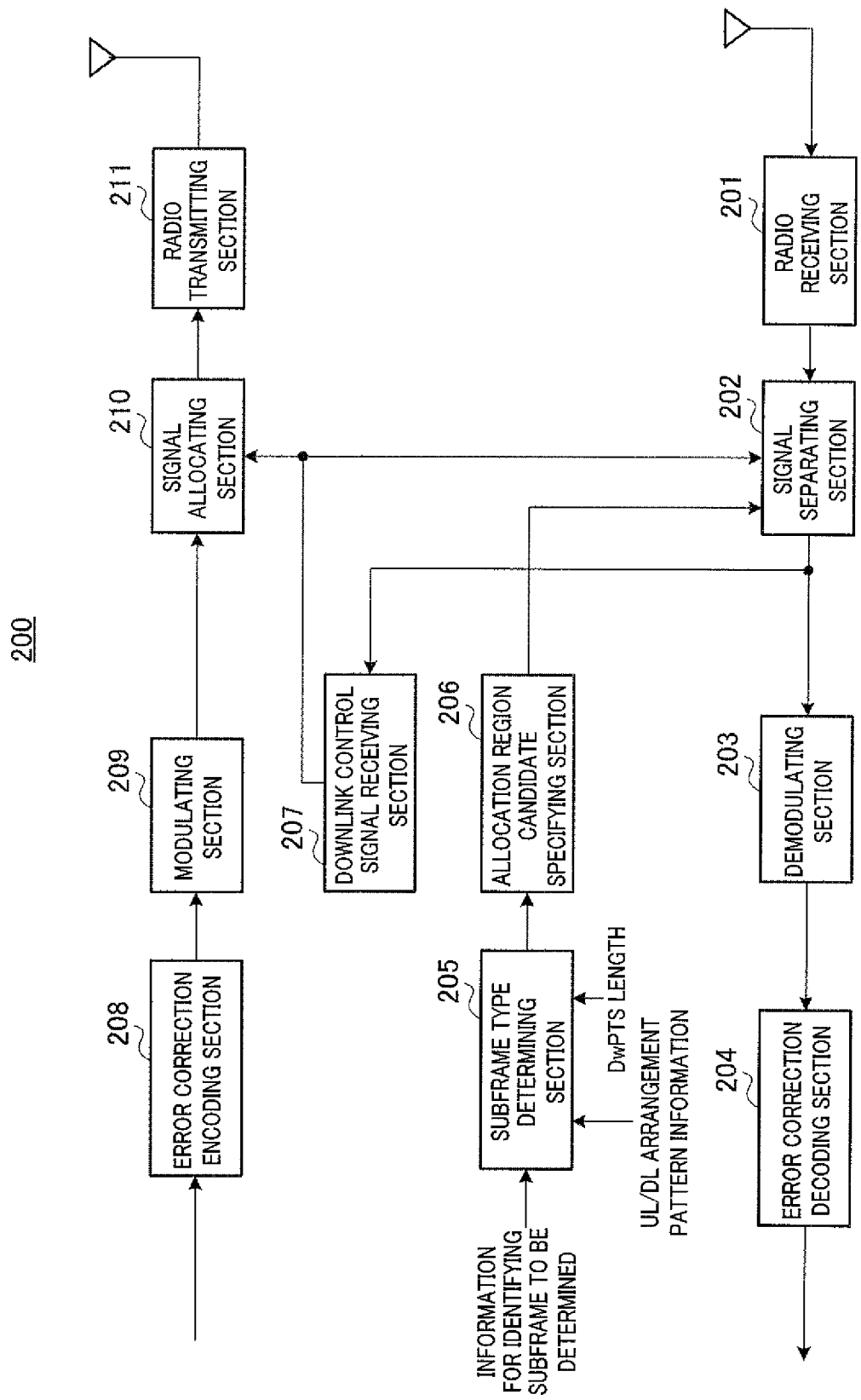
FIG. 7 is a block diagram showing the configuration of the terminal according to Embodiment 1 of the invention.

FIG. 7 is a block diagram showing the configuration of terminal 200 according to Embodiment 1 of the invention. In FIG. 7, terminal 200 has radio receiving section 201, signal separating section 202, demodulating section 203, error correction decoding section 204, subframe type determining section 205, allocation region candidate specifying section 206, downlink control signal receiving section 207, error correction encoding section 208, modulating section 209, signal allocating section 210, and radio transmitting section 211.

Radio receiving section 201 receives a signal transmitted from base station 100 through an antenna, performs radio processing, such as down-conversion, and outputs the resultant signal to signal separating section 202.

Signal separating section 202 extracts, from a received signal, a signal component corresponding to a resource region indicated by information relating to an allocation region candidate received from allocation region candidate specifying section 206, and outputs the extracted signal to downlink control signal receiving section 207. Signal separating section 202 extracts a data signal on the basis of a DL grant received from downlink control signal receiving section 207 and outputs the data signal to the demodulating section 203.

Demodulating section 203 demodulates an input signal and outputs the demodulated signal to error correction decoding section 204.

Error correction decoding section 204 decodes an input signal and outputs obtained received data.

Subframe type determining section 205 basically has the same function as subframe type determining section 101 of base station 100. Accordingly, description will not be repeated.

Allocation region candidate specifying section 206 specifies an allocation region candidate (that is, search space), to which the control information is mapped, in the PDCCH region or the R-PDCCH region in the subframe to be determined on the basis of the determination result by subframe type determining section 205. That is, when it is determined that the subframe to be determined is the first type sub frame, only the PDCCH region is a region in which an allocation region candidate can be present. Meanwhile, when it is determined that the subframe to be determined is the second type subframe, both the PDCCH region and the R-PDCCH region are regions in which an allocation region candidate can be present. Information relating to the specified allocation region candidate is output to signal separating section 202.

Downlink control signal receiving section 207 performs blind decoding on a signal received from signal separating section 202, and detects the downlink control signal. Downlink control signal receiving section 207 outputs the UL grant included in the detected downlink control signal to signal allocating section 210, and outputs the DL grant to signal separating section 202.

Error correction encoding section 208 receives transmission data as input, performs error correction encoding on transmission data, and outputs resultant data to modulating section 209.

Modulating section 209 modulates an input signal and outputs the modulated signal to signal allocating section 210.

Signal allocating section 210 maps the modulated signal received from modulating section 209 in accordance with the UL grant received from downlink control signal receiving section 207, and outputs the resultant signal to radio transmitting section 211.

Radio transmitting section 211 performs radio transmission processing, such as up-conversion, on an input signal and transmits the resultant signal through the antenna.

[Operation of Base Station 100 and Terminal 200]

The operations of base station 100 and terminal 200 configured as above will be described. In particular, subframe type determining processing, allocation region candidate deciding processing, and allocation region candidate specifying processing will be described.

<Subframe Type Determining Processing by Base Station 100>

In base station 100, subframe type determining section 101 determines whether the subframe to be determined is the first type subframe or the second type subframe in accordance with the "UL/DL configuration pattern" which is applied to the base station. Specifically, subframe type determining section 101 determines whether the subframe to be determined is the first type subframe or the second type subframe on the basis of the identification information of the subframe to be determined, the UL/DL configuration pattern information, and the "transmission rule table".

In the "transmission rule table", in regard to each of a plurality of configuration patterns having different downlink subframe and uplink subframe configurations, a plurality of downlink subframes in each configuration pattern are associated with uplink subframes in which the retransmission control signal relating to the downlink data signal corresponding to the downlink allocation control information to be transmitted in each downlink subframe can be transmitted.

FIG. 8 and FIG. 9 show an example of the "transmission rule table". In particular, FIG. 8 and FIG. 9 show a transmission rule table which is also used in LTE.

FIG. 8 shows a configuration pattern of uplink subframes and downlink subframes in one frame. In FIG. 8, the ratio of the uplink subframes and the downlink subframes in one frame differs between the configuration patterns. In FIG. 8, "U" represents an uplink subframe, "D" represents a downlink subframe, and "S" represents a switching subframe. In FIG. 9, a combination of a configuration pattern and subframe numbers in one frame is associated with "number of subframes". The "number of subframes" associated with a combination of an arbitrary configuration pattern and subframe numbers expresses that a retransmission control signal (ACK/NACK) relating to downlink data transmitted in a subframe before the subframe number by the "number of subframes" can be transmitted in the subframe of the subframe number. Accordingly, in this case, the "transmission rule table" is constituted by both tables shown in FIG. 8 and FIG. 9.

When the interval between a downlink subframe to be determined in which the downlink allocation control information is transmitted and an uplink subframe associated with the downlink subframe to be determined in the transmission rule table is equal to or greater than a "predetermined value", subframe type determining section 101 determines the downlink subframe to be determined as the second type subframe. The "predetermined value" is five subframes.

The configuration pattern includes switching subframes in addition to the downlink subframes and the uplink subframes. Each switching subframe includes a downlink period, an uplink period, and a guard period which is not used in both the downlink period and the uplink period. Accordingly, in the "transmission rule table", in regard to each of a plurality of configuration patterns having different configurations, the switching subframes in each configuration pattern are associated with uplink subframes in which the retransmission control signal relating to the downlink data signal corresponding to the downlink allocation control information to be transmitted in the downlink period of the switching sub frame can be transmitted. When the interval between a switching subframe to be determined and an uplink subframe associated with the switching subframe to be determined in the transmission rule table is equal to or greater than a "predetermined value", subframe type determining section 101 determines the switching subframe to be determined as the second type subframe. The "predetermined value" is five subframes.

Figure 10:
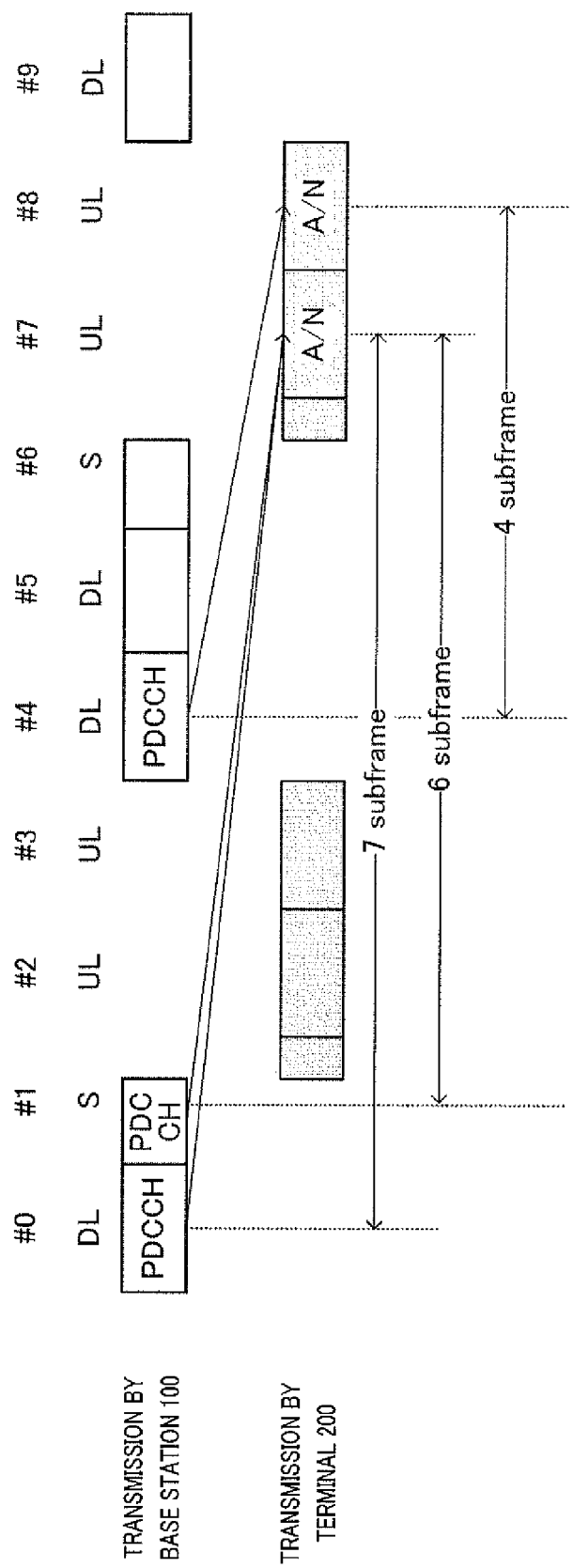
FIG. 10 is a diagram showing a transmission state of control information, downlink data, and retransmission control information by a configuration pattern 1.

FIG. 10 shows the timing at which DL data (PDSCH) instructed by the DL grant is transmitted from base station 100 to terminal 200 and the timing at which terminal 200 transmits retransmission control information (ACK/NACK) for DL data to base station 100 in a configuration pattern 1 (Uplink-Downlink configuration 1) shown in FIG. 8. As shown in FIG. 10, ACK/NACK for DL data transmitted in subframes #0 and #1 is transmitted in a subframe #7. The interval between the subframe #0 and the subframe #7 is seven subframes, and the interval between the subframe #1 and the subframe #7 is six subframes. Since these intervals are equal to or greater than the "predetermined value", when the subframe to be determined is the subframe #0 or #1, subframe type determining section 101 determines the downlink subframe to be determined as the second type subframe. Meanwhile, ACK/NACK for DL data transmitted in a subframe #4 is transmitted in a subframe #8. The interval between the subframe #4 and the subframe #8 is four subframes. Accordingly, since the interval between the subframe #4 and the subframe #8 is smaller than the "predetermined value", when the subframe to be determined is the subframe #4, subframe type determining section 101 determines the downlink subframe to be determined as the first type subframe.

Subframe type determining section 101 may add the following condition as the condition for determining the switching subframe to be determined as the second type subframe. That is, only when the length of the downlink period of the switching subframe to be determined is greater than a predetermined value, subframe type determining section 101 determines the switching subframe to be determined as the second type subframe.

Figure 11:
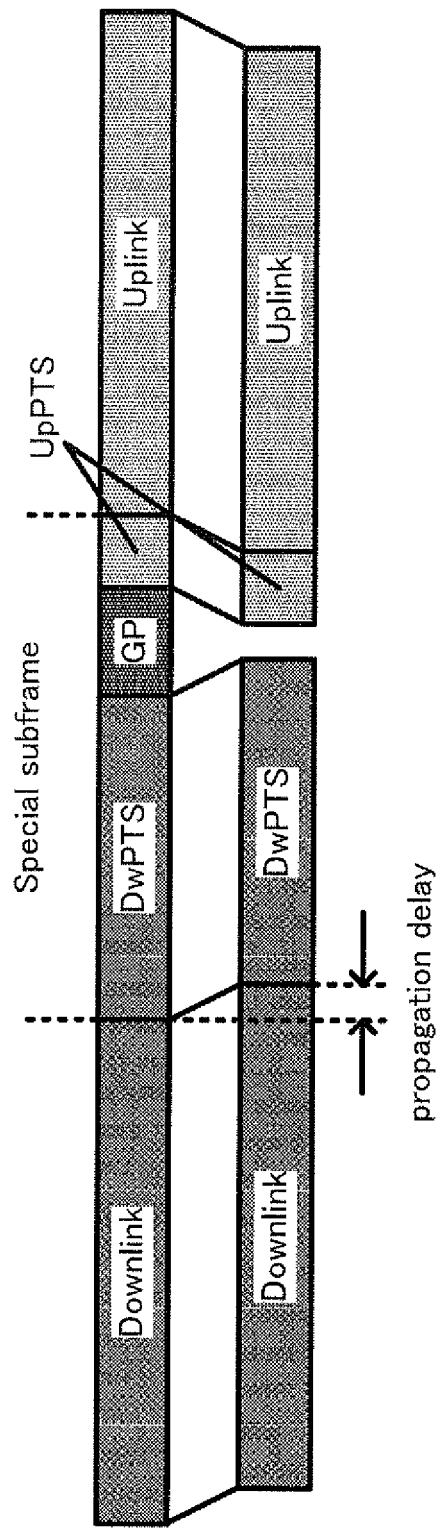
FIG. 11 is a diagram showing an example of a switching sub frame.

FIG. 11 shows an example of a switching subframe. As shown in FIG. 11, the switching subframe (Special subframe) includes a downlink period (DwPTS), an uplink period (UpPTS), and a guard period (GP) which is not used in both the downlink period and the uplink period. The switching subframe (Special subframe) is used for switching from the downlink subframe to the uplink subframe. The downlink period (DwPTS) is a period which is used for a DL signal, the guard period (GP) is a period which is provided so as to absorb transmission delay between base station 100 and terminal 200, and is not used for transmission, and the uplink period (UpPTS) is a period which is used for a UL signal. Accordingly, when a downlink control signal is transmitted in the switching subframe (Special subframe), only the downlink period (DwPTS) can be used.

The number of symbols of the downlink period (DwPTS) differs depending on the length of the downlink period (DwPTS). Ts=1/(15000×2048) seconds.

(1) When Normal CP is Used in the Downlink:

<1> The number of symbols of the downlink period (DwPTS) with the length of the downlink period (DwPTS)= 6592 Ts is 3. Accordingly, the downlink period (DwPTS) corresponds to OFDM symbols #0 to #2 (that is, only the PDCCH region).

<2> The number of symbols of the downlink period (DwPTS) with the length of the downlink period (DwPTS)= 19760 Ts is 9. Accordingly, the downlink period (DwPTS) corresponds to OFDM symbols #0 to #8.

<3> The number of symbols of the downlink period (DwPTS) with the length of the downlink period (DwPTS)= 21962 Ts is 10. Accordingly, the downlink period (DwPTS) corresponds to OFDM symbols #0 to #9.

<4> The number of symbols of the downlink period (DwPTS) with the length of the downlink period (DwPTS)= 24144 Ts is 11. Accordingly, the downlink period (DwPTS) corresponds to OFDM symbols #0 to #10.

<5> The number of symbols of the downlink period (DwPTS) with the length of the downlink period (DwPTS)= 26336 Ts is 12. Accordingly, the downlink period (DwPTS) corresponds to OFDM symbols #0 to #11.

(2) When Extended CP is Used in the Downlink:

<1> The number of symbols of the downlink period (DwPTS) with the length of the downlink period (DwPTS)= 7680 Ts is 3. Accordingly, the downlink period (DwPTS) corresponds to OFDM symbols #0 to #2 (that is, only the PDCCH region).

<2> The number of symbols of the downlink period (DwPTS) with the length of the downlink period (DwPTS)= 20480 Ts is 8. Accordingly, the downlink period (DwPTS) corresponds to OFDM symbols #0 to #7.

<3> The number of symbols of the downlink period (DwPTS) with the length of the downlink period (DwPTS)= 20480 Ts is 9. Accordingly, the downlink period (DwPTS) corresponds to OFDM symbols #0 to #8.

<4> The number of symbols of the downlink period (DwPTS) with the length of the downlink period (DwPTS)= 25600 Ts is 10. Accordingly, the downlink period (DwPTS) corresponds to OFDM symbols #0 to #9.

OFDM symbols #3 to #13 or #3 to #12 are allocated to the R-PDCCH region which is designed for the relay station. In regard to the DL grant, the OFDM symbols #3 to #6 in the R-PDCCH region are allocated.

Accordingly, in this embodiment, a case where subframe type determining section 101 determines the switching subframe to be determined as the second type subframe is limited to a case where OFDM symbols #3 to #6 are included in the downlink period (DwPTS). That is, in the above-described example, when Normal CP is used in the downlink or when Extended CP is used in the downlink, in the case <1>, subframe type determining section 101 determines the switching subframe to be determined as the first type subframe, not as the second type subframe.

<Allocation Region Candidate Deciding Processing by Base Station 100>

In base station 100, allocation region candidate deciding section 102 decides an allocation region candidate (that is, search space), to which the control information is mapped, in the PDCCH region or the R-PDCCH region in the subframe to be determined on the basis of the determination result by subframe type determining section 101. That is, when it is determined that the subframe to be determined is the first type subframe, only the PDCCH region is a region in which an allocation region candidate can be set. Meanwhile, when it is determined that the subframe to be determined is the second type subframe, both the PDCCH region and the R-PDCCH region are regions in which an allocation region candidate can be set.

<Subframe Type Determining Processing by Terminal 200>

In terminal 200, subframe type determining section 205 determines the type of the subframe to be determined.

Subframe type determining section 205 basically has the same function as subframe type determining section 101 of base station 100.

<Allocation Region Candidate Specifying Processing by Terminal 200>

In terminal 200, allocation region candidate specifying section 206 specifies an allocation region candidate (that is, search space), to which the control information is mapped, in the PDCCH region or the R-PDCCH region in the subframe to be determined on the basis of the determination result by subframe type determining section 205. That is, when it is determined that the subframe to be determined is the first type subframe, only the PDCCH region is a region in which an allocation region candidate can be present. Meanwhile, when it is determined that the subframe to be determined is the second type subframe, both the PDCCH region and the R-PDCCH region are regions in which an allocation region candidate can be present. Information relating to the specified allocation region candidate is output to signal separating section 202.

According to this embodiment described above, in base station 100 which maps control information to one of a first resource region and a second resource region provided in order in a time direction in a subframe and transmits the control information, subframe type determining section 101 determines whether the subframe to be determined is the first type subframe in which the control information can be mapped only to the first resource region or the second type subframe in which the control information can be mapped to both the first resource region and the second resource region in accordance with a configuration pattern which is applied to the base station and is one of a plurality of configuration patterns having different downlink subframe and uplink subframe configurations in time-division multiplex. Allocation region candidate deciding section 102 decides a mapping region, to which the control information is mapped, in the first resource region or the second resource region in the subframe to be determined on the basis of the determination result by subframe type determining section 101.

Specifically, in Embodiment 1, the control information is downlink allocation control information (DL grant) which instructs a mapping region to which a downlink data signal is mapped, and a plurality of downlink subframes in each configuration pattern are associated with uplink subframes in which retransmission control signal relating to the downlink data signal corresponding to the downlink allocation control information to be transmitted in each downlink subframe can be transmitted. When a downlink subframe to be determined in which the downlink allocation control information is transmitted and an uplink subframe associated with the downlink subframe to be determined is equal to or greater than a predetermined value, subframe type determining section 101 determines the downlink subframe to be determined as the second type subframe.

In this way, it is possible to sufficiently secure the time until ACK/NACK for downlink data is transmitted after downlink data is received on the reception side (terminal 200) of the downlink allocation control information (DL grant).

A subframe number in which the R-PDCCH region is not used for transmitting a control signal is shared in advance by base station 100 and terminal 200, thereby reducing the number of times of blind decoding by terminal 200.

If the same "transmission rule table" as in LTE is used, the correspondence relationship between a subframe in which the DL grant is transmitted and a subframe in which ACK/NACK for downlink data is transmitted has no change from LTE. Accordingly, change from scheduling in an LTE base station and an LTE terminal can be minimized, the impact of the change on a scheduler of base station 100 is low, and the impact of the change on terminal 200 is low.

According to this embodiment, in terminal 200 which receives control information in one of a first resource region and a second resource region provided in order in a time direction in a subframe, subframe type determining section 205 determines whether the subframe to be determined is the first type subframe in which the control information can be mapped to the first resource region or the second type subframe in which the control information can be mapped to both the first resource region and the second resource region in accordance with a configuration pattern which is applied to the terminal and is one of a plurality of configuration patterns having different downlink subframe and uplink subframe configurations in time-division multiplex. Allocation region candidate specifying section 206 specifies a mapping region candidate, to which the control information is mapped, in the first resource region or the second resource region in the subframe to be determined on the basis of the determination result by subframe type determining section 205.

Specifically, when the interval between a downlink subframe to be determined in which the downlink allocation control information is transmitted and an uplink subframe associated with the downlink subframe to be determined is equal to or greater than a predetermined value, subframe type determining section 205 specifies the downlink subframe to be determined as the second type subframe.

In the above description, a case where direct communication is performed between base station 100 and terminal 200 has been described. In contrast, when communication is performed between the base station and terminal 200 through the relay station, the relay station may basically have the same configuration as base station 100 described above, and may perform the same operation. However, when terminal 200 is connected to the relay station, the relay station provides a subframe (that is, backhaul subframe) for communication with the base station. Accordingly, the relay station cannot provide a service to terminal 200 in a certain subframe.

Accordingly, the "transmission rule table" which is used in the relay station and terminal 200 at this time is, for example, as shown in FIG. 12 and FIG. 13. FIG. 12 shows a configuration pattern of backhaul subframes (for uplink and downlink) in one frame. That is, when a configuration pattern 0 of backhaul subframes is selected, there is a possibility that the relay station cannot perform communication with terminal 200 in a subframe #4 and a sub frame #8.

In FIG. 13, a combination of a backhaul subframe configuration pattern, an uplink sub frame and downlink subframe configuration pattern, and subframe numbers in one frame is associated with "number of subframes" or information representing whether or not a subframe is a backhaul subframe.

In FIG. 13, for example, a backhaul subframe configuration pattern #5 is associated with a UL/DL configuration pattern #2 shown in FIG. 8 and FIG. 9. For this reason, since subframes #2 and #8 are used as a backhaul subframe, even when terminal 200 transmits ACK/NACK to the relay station in this subframe, the relay station cannot receive ACK/NACK. Accordingly, terminal 200 transmits ACK/NACK in a subframe which is not used as a backhaul subframe. Therefore, when a backhaul subframe configuration pattern #5 is used, an uplink subframe which can be used by terminal 200 is only a subframe #7. As a result, in the subframe #7, terminal 200 transmits ACK/NACK for downlink data transmitted in downlink sub frames #0, #3, #4, #5, #9, and switching subframes #1 and #6. In this case, when the interval between a downlink subframe to be determined in which the downlink allocation control information is transmitted and an uplink subframe associated with the downlink subframe to be determined in the transmission rule table is equal to or greater than a "predetermined value", subframe type determining section 101 determines the downlink sub frame to be determined as the second type subframe. The "predetermined value" is five sub frames.

In the above description, a case where direct communication is performed between base station 100 and terminal 200 has been described. However, this technique can be applied to a case where terminal 200 is replaced with the relay station, and communication is performed between base station 100 and the relay station.

Embodiment 2

In Embodiment 1, a case where the control information is the downlink allocation control information (that is, DL grant) which instructs a mapping region to which the downlink data signal is mapped has been described. In contrast, in Embodiment 2, a case where the control information is uplink allocation control information (that is, UL grant) which instructs a mapping region to which an uplink data signal is mapped will be described. Since a base station and a terminal according to Embodiment 2 are the same as base station 100 and terminal 200 according to Embodiment 1, description will be provided with reference to FIG. 6 and FIG. 7.

In base station 100 of Embodiment 2, subframe type determining section 101 determines the type of a subframe to be determined.

Specifically, subframe type determining section 101 determines whether a subframe to be determined is a first type subframe in which control information can be mapped only to the PDCCH region or a second type subframe in which the control information can be mapped to both the PDCCH region and the R-PDCCH region. The control information is uplink allocation control information (that is, UL grant) which instructs a mapping region to which an uplink data signal is mapped.

Specifically, subframe type determining section 101 receives identification information of the subframe to be determined, UL/DL configuration pattern information, and the DwPTS length as input. Subframe type determining section 101 determines whether the subframe to be determined is the first type sub frame or the second type subframe on the basis of the identification information of the subframe to be determined, the UL/DL configuration pattern information, and the "transmission rule table".

In the "transmission rule table", in regard to each of a plurality of configuration patterns having different downlink subframe and uplink subframe configurations, a plurality of downlink subframes in the configuration pattern are associated with uplink subframes in which the uplink data signal corresponding to the uplink allocation control information to be transmitted in each downlink subframe can be transmitted. When the interval between a downlink subframe to be determined in which the uplink allocation control information is transmitted and an uplink subframe associated with the downlink subframe to be determined is equal to or greater than a "predetermined value", subframe type determining section 101 determines the downlink subframe to be determined as the second type subframe. The "predetermined value" is, for example, five subframes.

The configuration pattern includes switching subframes in addition to the downlink subframe and the uplink subframes. Each switching subframe includes a downlink period, an uplink period, and a guard period which is not used in both the downlink period and the uplink period. Accordingly, in the "transmission rule table", in regard to each of a plurality of configuration patterns having different configurations, the switching subframes in the configuration pattern are associated with uplink subframes in which the uplink data signal corresponding to the uplink allocation control information to be transmitted in the downlink period of each switching subframe can be transmitted. When the interval between a switching subframe to be determined and an uplink subframe associated with the switching subframe to be determined in the transmission rule table is equal to or greater than a "predetermined value", subframe type determining section 101 determines the switching subframe to be determined as the second type subframe.

Subframe type determining section 101 may add the following condition as the condition for determining the switching subframe to be determined as the second type subframe. That is, only when the length of the downlink period of the switching subframe to be determined is greater than a predetermined value, subframe type determining section 101 determines the switching subframe to be determined as the second type subframe. The transmission rule table is stored in a storage section (not shown) provided in subframe type determining section 101.

Terminal 200 of Embodiment 2 basically has the same function as subframe type determining section 101 of base station 100. Accordingly, description thereof will not be repeated.

The operations of base station 100 and terminal 200 of Embodiment 2 configured as above will be described. In particular, subframe type determining processing will be described.

<Subframe Type Determining Processing by Base Station 100>

Subframe type determining section 101 determines whether the subframe to be determined is the first type subframe or the second type subframe in accordance with the "UL/DL configuration pattern" which is applied to the base station. Specifically, subframe type determining section 101 determines whether the subframe to be determined is the first type sub frame or the second type subframe on the basis of the identification information of the subframe to be determined, the UL/DL configuration pattern information, and the "transmission rule table".

In the "transmission rule table", in regard to each of a plurality of configuration patterns having different downlink subframe and uplink subframe configurations, a plurality of downlink subframes in the configuration pattern are associated with uplink subframes in which the uplink data signal corresponding to the uplink allocation control information to be transmitted in each downlink subframe can be transmitted.

FIG. 14 shows an example of the "transmission rule table." In FIG. 14, a combination of a configuration pattern and subframe numbers in one frame is associated with "number of subframes," The "number of subframes" associated with a combination of an arbitrary configuration pattern and subframe numbers expresses that uplink data for the UL grant transmitted in a subframe before the subframe number by the "number of subframes" can be transmitted in the subframe of the subframe number. Accordingly, the "transmission rule table" is constituted by both tables shown in FIG. 8 and FIG. 14.

When the interval between a downlink subframe to be determined in which the uplink allocation control information is transmitted and an uplink subframe associated with the downlink subframe to be determined is equal to or greater than a "predetermined value", subframe type determining section 101 determines the downlink subframe to be determined as the second type subframe.

The configuration pattern includes switching subframes in addition to the downlink subframes and the uplink subframes. Each switching subframe includes a downlink period, an uplink period, and a guard period which is not used in both the downlink period and the uplink period. Accordingly, in the "transmission rule table", in regard to each of a plurality of configuration patterns having different configurations, the switching sub frames in the configuration pattern are associated with uplink subframes in which the uplink data signal corresponding to the uplink allocation control information to be transmitted in the downlink period of each switching subframe can be transmitted. When the interval between a switching subframe to be determined and an uplink sub frame associated with the switching subframe to be determined in the transmission rule table is equal to or greater than a "predetermined value", subframe type determining section 101 determines the switching subframe to be determined as the second type subframe.

In a configuration pattern 0 of FIG. 14, resource allocation for uplink data to be transmitted in subframes #2 and #3 is performed by the UL grant which is transmitted in a subframe #6. Similarly, resource allocation for uplink data to be transmitted in subframes #7 and #8 is performed by the UL grant which is transmitted in a subframe #1. In this way, allocation for a plurality of pieces of uplink data to be transmitted in a plurality of subframes is performed by a plurality of UL grants which are transmitted in one subframe. Accordingly, in this case, when the UL grant is transmitted only in the PDCCH region, there is an increasing possibility that the PDCCH region is tight. In this case, with the use of the technique of this embodiment, when a predetermined condition is satisfied, the UL grant can be arranged in the R-PDCCH region, thereby reducing the possibility that the PDCCH region is tight.

Figure 15:
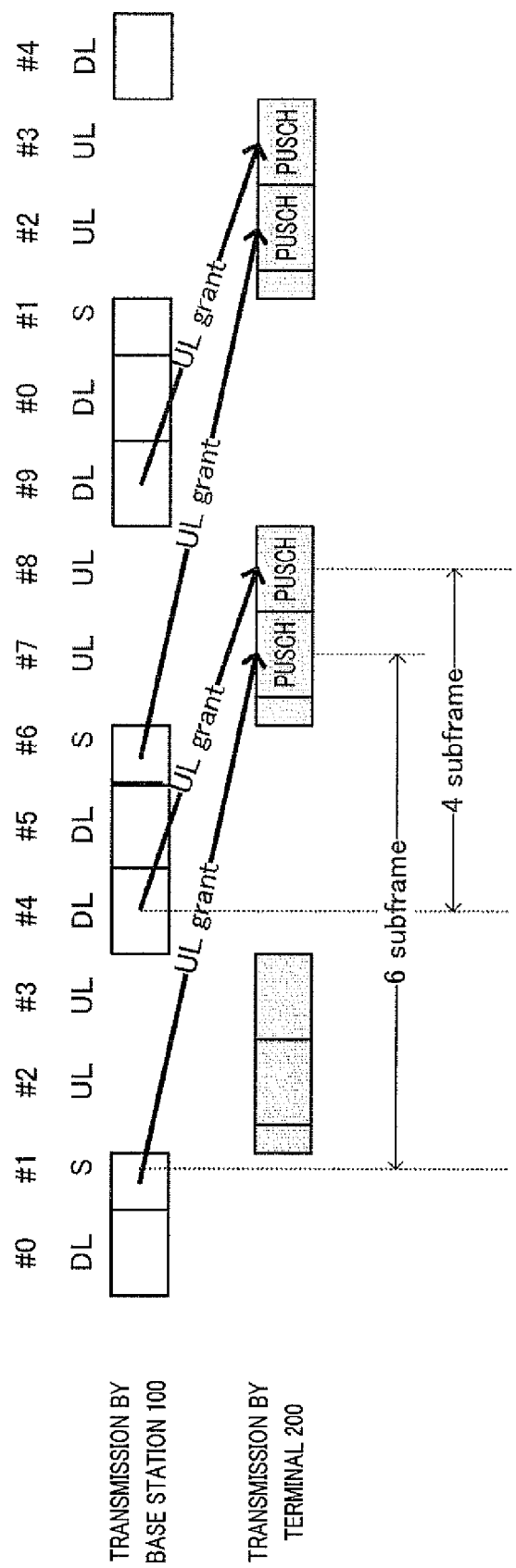
FIG. 15 is a diagram showing a transmission state of control information and uplink data by the configuration pattern 1.

FIG. 15 shows the timing at which the UL grant is transmitted from base station 100 to terminal 200 and the timing at which terminal 200 transmits uplink data (PDSCH) for the UL grant to base station 100 in the configuration pattern 1 (Uplink-Downlink configuration 1) shown in FIG. 8. As shown in FIG. 15, uplink data (PDSCH) for the UL grant transmitted in a subframe #1 is transmitted in a subframe #7. Uplink data (PDSCH) for the UL grant transmitted in a subframe #6 is transmitted in a subframe #2 of a frame next to a frame to which the subframe #6 belongs. The interval between the subframe #1 and the subframe #7 and the interval between the subframe #6 and the subframe #2 of the next frame are six subframes. Since these intervals are equal to or greater than a "predetermined value", when the subframe to be determined is the subframe #1 or #6, subframe type determining section 101 determines the downlink subframe to be determined as the second type subframe. Uplink data (PDSCH) for the UL grant transmitted in a subframe #4 is transmitted in a subframe #8. Uplink data (PDSCH) for the UL grant transmitted in a subframe #9 is transmitted in a subframe #3 of a frame next to a frame to which the subframe #9 belongs. The interval between the subframe #4 and the subframe #8 and the interval between the subframe #9 and the subframe #3 of the next frame are four subframes. Since these intervals are smaller than the "predetermined value", when the subframe to be determined is the subframe #4 or #9, subframe type determining section 101 determines the downlink subframe to be determined as the first type subframe.

Subframe type determining section 101 may add the following condition as the condition for determining the switching subframe to be determined as the second type subframe. That is, only when the length of the downlink period of the switching subframe to be determined is greater than a predetermined value, subframe type determining section 101 determines the switching subframe to be determined as the second type subframe. The transmission rule table is stored in a storage section (not shown) provided in subframe type determining section 101.

The number of symbols of the downlink period (DwPTS) differs depending on the length of the downlink period (DwPTS).

(1) When Normal CP is Used in the Downlink:

<1> The number of symbols of the downlink period (DwPTS) with the length of the downlink period (DwPTS)= 6592 Ts is 3. Accordingly, the downlink period (DwPTS) corresponds to OFDM symbols #0 to #2 (that is, only the PDCCH region).

<2> The number of symbols of the downlink period (DwPTS) with the length of the downlink period (DwPTS)= 19760 Ts is 9. Accordingly, the downlink period (DwPTS) corresponds to OFDM symbols #0 to #8. In particular, in the second slot, there are two symbols of the OFDM symbols #7 and #8.

<3> The number of symbols of the downlink period (DwPTS) with the length of the downlink period (DwPTS)= 21962 Ts is 10. Accordingly, the downlink period (DwPTS) corresponds to OFDM symbols #0 to #9. In particular, in the second slot, there are three symbols of the OFDM symbols #7 to #9.

<4> The number of symbols of the downlink period (DwPTS) with the length of the downlink period (DwPTS)= 24144 Ts is 11. Accordingly, the downlink period (DwPTS) corresponds to OFDM symbols #0 to #10. In particular, in the second slot, there are four symbols of the OFDM symbols #7 to #10.

<5> The number of symbols of the downlink period (DwPTS) with the length of the downlink period (DwPTS)= 26336 Ts is 12. Accordingly, the downlink period (DwPTS) corresponds to OFDM symbols #0 to #11. In particular, in the second slot, there are five symbols of the OFDM symbols #7 to #11.

(2) When Extended CP is Used in the Downlink:

<1> The number of symbols of the downlink period (DwPTS) with the length of the downlink period (DwPTS)= 7680 Ts is 3. Accordingly, the downlink period (DwPTS) corresponds to OFDM symbols #0 to #2 (that is, only the PDCCH region).

<2> The number of symbols of the downlink period (DwPTS) with the length of the downlink period (DwPTS)= 20480 Ts is 8. Accordingly, the downlink period (DwPTS) corresponds to OFDM symbols #0 to #7. In particular, in the second slot, there are two symbols of the OFDM symbols #6 and #7.

<3> The number of symbols of the downlink period (DwPTS) with the length of the downlink period (DwPTS)= 20480 Ts is 9. Accordingly, the downlink period (DwPTS) corresponds to OFDM symbols #0 to #8. In particular, in the second slot, there are three symbols of the OFDM symbols #6 to #8.

<4> The number of symbols of the downlink period (DwPTS) with the length of the downlink period (DwPTS)= 25600 Ts is 10. Accordingly, the downlink period (DwPTS) corresponds to OFDM symbols #0 to #9. In particular, in the second slot, there are four symbols of the OFDM symbols #6 to #9.

OFDM symbols #3 to #13 or #3 to #12 are allocated to the R-PDCCH region which is designed for the relay station. Since the UL grant is arranged in the second slot, in regard to the UL grant, the OFDM symbols #7 to #13 in the R-PDCCH region are allocated.

Accordingly, in this embodiment, a case where subframe type determining section 101 determines the switching subframe to be determined as the second type subframe is limited to a case where the OFDM symbols #7 to #9 are included in the downlink period (DwPTS) (that is, a portion which is within the downlink period (DwPTS) and belongs to the second slot is equal to or greater than 3 symbols). That is, a case where subframe type determining section 101 determines the switching subframe to be determined as the second type subframe is limited to a case where the leading three symbols of the second slot can be used for the UL grant. In the above-described example, when Normal CP is used in the downlink and when Extended CP is used in the downlink, in the cases <1> and <2>, subframe type determining section 101 determines the switching subframe to be determined as the first type subframe, not as the second type subframe.

The reason for using three symbols as reference is that, if the number of symbols as reference is smaller than four symbols prepared in the first region for the DL grant by one symbol, the transmission of the UL grant can be carried out. This is because, if it is designed such that, even when two or less symbols are used, the UL grant is transmitted in the R-PDCCH region, it is not preferable in that the number of resource blocks (RB) necessary for the R-PDCCH increases.

In HetNet (pico cell or femto cell) with a small cell radius, the user of the R-PDCCH region for transmitting the allocation control information is considered. HetNet may be arranged within the cell radius of the base station, and interference imposed on the base station and interference imposed from the base station (that is, interferences between HetNet and the base station) remain to be solved. In particular, interference between control signals to be transmitted in the PDCCH region remains to be solved. In contrast, the R-PDCCH to be transmitted in the data region is used for transmitting the allocation control information, thereby reducing interference between control signals.

As described above, in this embodiment, the R-PDCCH region can be used when the downlink period (DwPTS) is long. The length of the downlink period (DwPTS) is defined by the cell radius. That is, as HetNet, when the cell radius is small, the delay time between the base station and the terminal (mobile station) is short, the guard period is shortened, and thus, the downlink period (DwPTS) is lengthened. Accordingly, the determination of the subframe type in this embodiment is applied to HetNet with a small cell radius, thereby increasing a possibility that, in HetNet necessary for interference control, the R-PDCCH region is used for transmitting the allocation control information.

Alternatively, the following handling is also possible. When a portion which is within the downlink period (DwPTS) and belongs to the second slot is two symbols, the transmission of both the DL grant and the UL grant may be permitted in a common region in which a first slot portion and a second slot portion of the R-PDCCH region are collected. That is, when Normal CP is used in the downlink, the OFDM symbols #3 to #8 are used as the common region, and when Extended CP is used in the downlink, the OFDM symbols #3 to #7 are used as the common region. In this way, since the number of symbols which can be used for the DL grant or the UL grant increases, it is possible to improve control signal reception quality. It is possible to prevent a situation in which only the R-PDCCH region of the first slot is used, and the PDCCH region of the second slot is in an empty state (an unused state), thereby improving resource use efficiency.

<Subframe Type Determining Processing by Terminal 200>

In terminal 200 of Embodiment 2, subframe type determining section 205 determines the type of the subframe to be determined. Subframe type determining section 205 basically has the same function as subframe type determining section 101 of base station 100.

According to this embodiment described above, in base station 100 which maps control information to one of a first resource region and a second resource region provided in order in a time direction in a subframe and transmits the control information, subframe type determining section 101 determines whether the subframe to be determined is the first type subframe in which the control information can be mapped only to the first resource region or the second type subframe in which the control information can be mapped to both the first resource region and the second resource region in accordance with a configuration pattern which is applied to the base station and is one of a plurality of configuration patterns having different downlink subframe and uplink subframe configurations in time-division multiplex. Allocation region candidate deciding section 102 decides a mapping region, to which the control information is mapped, in the first resource region or the second resource region in the subframe to be determined on the basis of the determination result by subframe type determining section 101.

Specifically, in Embodiment 2, the control information is the uplink allocation control information (UL grant) which instructs a mapping region to which the uplink data signal is mapped, and a plurality of downlink subframes in each configuration pattern are associated with uplink subframes in which the uplink data signal corresponding to the uplink allocation control information to be transmitted in each downlink subframe can be transmitted. When the interval between a downlink subframe to be determined in which the uplink allocation control information is transmitted and an uplink subframe associated with the downlink subframe to be determined is equal to or greater than a predetermined value, subframe type determining section 101 determines the downlink subframe to be determined as the second type subframe.

In this way, it is possible to sufficiently secure the time until uplink data for the uplink allocation control information (UL grant) is transmitted after the uplink allocation control information (UL grant) is received on the reception side (terminal 200) of the uplink allocation control information (UL grant).

A subframe number in which the R-PDCCH region is not used for transmitting a control signal is shared in advance by base station 100 and terminal 200, thereby reducing the number of times of blind decoding by terminal 200.

If the same "transmission rule table" as in LTE is used, the correspondence relationship between a subframe in which the UL grant is transmitted and a subframe in which uplink data for the UL grant is transmitted has no change from LTE. Accordingly, change from scheduling in an LTE base station and an LTE terminal can be minimized, the impact of the change on a scheduler of base station 100 is low, and the impact of the change on terminal 200 is low.

Other Embodiments (1) Although in each embodiment, a resource region which is used as a data resource region in LTE and in which a control signal is arranged in LTE-A is called the R-PDCCH region, this resource region may be called an enhanced PDCCH region or other names.

(2) Although in each embodiment, a case where the leading OFDM symbol of the R-PDCCH region in each subframe is the fourth OFDM symbol (that is, the OFDM symbol #3), the invention is not limited thereto, and the value of PCFICH (a signal for designating the number of symbols of the PDCCH region) may be notified from the base station to the terminal, thereby varying the start position of the R-PDCCH region in each subframe. Alternatively, with higher layer signaling, the leading OFDM symbol of the R-PDCCH region may be notified from the base station to the terminal.

(3) Although in each embodiment, an antenna has been described, the invention may also be applied to an antenna port.

The antenna port refers to a logical antenna having one or a plurality of physical antennas. That is, the antenna port is not necessarily limited to one physical antenna, and may refer to an array antenna having a plurality of antennas, or the like.

For example, in 3GPP LTE, the number of physical antennas which constitute an antenna port is not defined, and antenna port is defined as the minimum section in which the base station can transmit a reference signal.

An antenna port may be defined as the minimum section of multiplying a weight of a precoding vector.

(4) Although in each embodiment, a case where the invention is constituted by hardware has been described, the invention may be realized by software in cooperation with hardware.

Each functional block used in the description of the embodiments may be typically implemented by an integrated circuit or LSI (Large Scale Integration). These may be individual chips, or a part or all of them may be included in a single chip. The term "LSI" may also be referred to as "IC", "system LSI", "super LSI", or "ultra LSI" due to the difference in integration.

The method of circuit integration is not limited to LSI, and circuit integration may be implemented by dedicated circuits or general-purpose processors. After LSI manufacture, a programmable FPGA (Field Programmable Gate Array) or a reconfigurable processor in which connections or settings of circuit cells in LSI can be reconfigured may be used.

With the advancement of semiconductor technology or other derivative technology, if integrated circuit technology comes out to replace LSI, integration of functional blocks may be of course carried out using this technology. Application of biotechnology or the like is also possible.

The disclosures of the specification, the drawings, and the abstract included in Japanese Patent Application No. 2010-228713, filed Oct. 8, 2010 are all incorporated herein.

INDUSTRIAL APPLICABILITY

The base station, the terminal, the transmission apparatus, and the transmission method of the invention are useful as allowing data processing on a reception side to have a margin regardless of the time position of a resource region to which control information is mapped.

REFERENCE SIGNS LIST

100 Base station
101, 205 Subframe type determining section
102 Allocation region candidate deciding section
103 Control signal allocating section
104, 208 Error correction encoding section
105, 209 Modulating section
106 Signal allocating section
107, 211 Radio transmitting section
108, 201 Radio receiving section
109, 203 Demodulating section
110, 204 Error correction decoding section
200 Terminal
202 Signal separating section
206 Allocation region candidate specifying section
207 Downlink control signal receiving section
210 Signal allocating section

The invention claimed is:

1. A base station which maps control information to one of a first resource region and a second resource region provided in order in a time direction in a subframe and transmits the control information, the base station comprising:
a determining section that determines the subframe type of a subframe being considered in accordance with a configuration pattern that, which is applied to the base station and is one of a plurality of configuration patterns having different downlink and uplink subframe configurations in time-division multiplex, wherein the subframe type is a first type subframe in which the control information is mapped only to the first resource region or a second type subframe in which the control information is mapped to both the first resource region and the second resource region; and
a deciding section that decides a mapping region, to which the control information is mapped, in the first resource region or the second resource region in the subframe being considered on the basis of the subframe type determined by the determining section,
wherein:
the configuration pattern includes switching subframes in addition to the downlink subframes and the uplink subframes, and each switching subframe includes a downlink period, an uplink period, and a guard period which is not used in both the downlink period and the uplink period;
the switching subframes in the configuration pattern are associated with uplink subframes in which a retransmission control signal relating to a downlink data signal corresponding to downlink allocation control information to be transmitted in the downlink period of each switching subframe is transmitted; and
when an interval between a switching subframe being considered and an uplink subframe associated with the switching subframe being considered is equal to or greater than a predetermined value, the determining section determines the subframe type of the switching subframe being considered as the second type subframe.

2. The base station according to claim 1, wherein:
only when a length of the downlink period of the switching subframe being considered is greater than a predetermined value, the determining section determines the subframe type of the switching subframe being considered as the second type sub frame.

3. A terminal which receives control information in one of a first resource region and a second resource region provided in order in a time direction in a subframe, the terminal comprising:
a determining section that determines the subframe type of a subframe being considered in accordance with a configuration pattern which is applied to the base station and is one of a plurality of configuration patterns having different downlink and uplink subframe configurations in time-division multiplex, wherein the subframe type is a first type subframe in which the control information is mapped only to the first resource region or a second type subframe in which the control information is mapped to both the first resource region and the second resource region; and
a specifying section that specifies a mapping region candidate, to which the control information is mapped, in the first resource region or the second resource region in the subframe being considered on the basis of the subframe type determined by the determining section,
wherein:
the configuration pattern includes switching subframes in addition to the downlink subframes and the uplink subframes, and each switching subframe includes a downlink period, an uplink period, and a guard period which is not used in both the downlink period and the uplink period;
the switching subframes in the configuration pattern are associated with uplink subframes in which a retransmission control signal relating to a downlink data signal corresponding to downlink allocation control information to be transmitted in the downlink period of each switching subframe is transmitted; and
when an interval between a switching subframe being considered and an uplink subframe associated with the switching subframe being considered is equal to or greater than a predetermined value, the determining section determines the subframe type of the switching subframe being considered as the second type subframe.

4. The terminal according to claim 3, wherein:
only when a length of the downlink period of the switching subframe being considered is greater than a predetermined value, the determining section determines the subframe type of the switching subframe being considered as the second type subframe.

5. A transmission method, executed by a processor of a base station, which maps control information to one of a first resource region and a second resource region provided in order in a time direction in a subframe and transmits the control information, the transmission method comprising the steps of:
- determining the subframe type of a subframe being considered in accordance with a configuration pattern which is applied to the base station and is one of a plurality of configuration patterns having different downlink and uplink subframe configurations in time-division multiplex, wherein the subframe type is a first type subframe in which the control information is mapped only to the first resource region or a second type subframe in which the control information is mapped to both the first resource region and the second resource region; and
- deciding a mapping region, to which the control information is mapped, in the first resource region or the second resource region in the subframe being considered on the basis of the determined subframe type, wherein:
- the configuration pattern includes switching subframes in addition to the downlink subframes and the uplink subframes, and each switching subframe includes a downlink period, an uplink period, and a guard period which is not used in both the downlink period and the uplink period;
- the switching subframes in the configuration pattern are associated with uplink subframes in which a retransmission control signal relating to a downlink data signal corresponding to downlink allocation control information to be transmitted in the downlink period of each switching subframe is transmitted; and
- when an interval between a switching subframe being considered and an uplink subframe associated with the switching subframe being considered is equal to or greater than a predetermined value, the determining section determines the subframe type of the switching subframe being considered as the second type subframe.

6. A reception method, executed by a processor of a terminal, which receives control information in one of a first resource region and a second resource region provided in order in a time direction in a subframe, the reception method comprising the steps of:
- determining the subframe type of a subframe being considered in accordance with a configuration pattern which is applied to the base station and is one of a plurality of configuration patterns having different downlink and uplink subframe configurations in time-division multiplex, wherein the subframe type is a first type subframe in which the control information is mapped only to the first resource region or a second type subframe in which the control information is mapped to both the first resource region and the second resource region; and
- specifying a mapping region candidate, to which the control information is mapped, in the first resource region or the second resource region in the subframe being considered on the basis of the determined subframe type, wherein:
- the configuration pattern includes switching subframes in addition to the downlink subframes and the uplink subframes, and each switching subframe includes a downlink period, an uplink period, and a guard period which is not used in both the downlink period and the uplink period;
- the switching subframes in the configuration pattern are associated with uplink subframes in which a retransmission control signal relating to a downlink data signal corresponding to downlink allocation control information to be transmitted in the downlink period of each switching subframe is transmitted; and
- when an interval between a switching subframe being considered and an uplink subframe associated with the switching subframe being considered is equal to or greater than a predetermined value, the determining step determines the subframe type of the switching subframe being considered as the second type subframe.

* * * * *